United States Patent
Nakamura et al.

(10) Patent No.: US 8,899,120 B2
(45) Date of Patent: Dec. 2, 2014

(54) LINEAR ACTUATOR

(75) Inventors: Manabu Nakamura, Nagano (JP); Masahiro Kobayashi, Nagano (JP)

(73) Assignee: Minebea Co., Ltd., Nagano (JP)

( * ) Notice: Subject to any disclaimer, the term of this patent is extended or adjusted under 35 U.S.C. 154(b) by 206 days.

(21) Appl. No.: 13/372,562

(22) Filed: Feb. 14, 2012

(65) Prior Publication Data

US 2012/0210810 A1  Aug. 23, 2012

(30) Foreign Application Priority Data

Feb. 22, 2011 (JP) ................................. 2011-036147

(51) Int. Cl.
| | | |
|---|---|---|
| *F16H 25/22* | (2006.01) | |
| *H02K 7/06* | (2006.01) | |
| *F16H 25/24* | (2006.01) | |
| *F16H 25/20* | (2006.01) | |

(52) U.S. Cl.
CPC .......... *H02K 7/06* (2013.01); *F16H 2025/2078* (2013.01); *F16H 25/2409* (2013.01); *F16H 25/2238* (2013.01)
USPC ........................................... 74/89.34; 310/80

(58) Field of Classification Search
USPC ................. 74/89, 89.31, 89.32, 89.33, 89.34, 74/89.23, 89.37, 89.39
See application file for complete search history.

(56) References Cited

U.S. PATENT DOCUMENTS

| | | | | |
|---|---|---|---|---|
| 2,951,390 A | * | 9/1960 | Martens et al. | 74/424.92 |
| 4,693,131 A | * | 9/1987 | Teramachi | 74/89.32 |
| 5,461,935 A | * | 10/1995 | Hill | 74/89.38 |
| 5,499,547 A | * | 3/1996 | Nagai et al. | 74/89.34 |
| 5,899,114 A | * | 5/1999 | Dolata et al. | 74/424.85 |
| 5,916,325 A | * | 6/1999 | Madrid et al. | 74/89.38 |
| 6,439,072 B1 | * | 8/2002 | Kajita et al. | 74/89.23 |
| 6,685,382 B2 | * | 2/2004 | Capewell et al. | 403/343 |
| 6,882,073 B2 | * | 4/2005 | Suzuki et al. | 310/80 |
| 2002/0043880 A1 | | 4/2002 | Suzuki et al. | |
| 2005/0046291 A1 | * | 3/2005 | Suzuki et al. | 310/80 |

FOREIGN PATENT DOCUMENTS

| | | | |
|---|---|---|---|
| JP | 2002-122203 A | 4/2002 | |
| JP | 2002-372117 A | 12/2002 | |

* cited by examiner

*Primary Examiner* — Troy Chambers
*Assistant Examiner* — Jude Agendia
(74) *Attorney, Agent, or Firm* — Carrier Blackman & Associates, P.C.; Joseph P. Carrier; Fulchand P. Shende

(57) ABSTRACT

A linear actuator is provided which includes a motor and a screw as an output shaft and in which the rotational movement of the motor is converted into the linear movement of the screw, wherein at least one retainer to hold a plurality of balls is disposed at the inner periphery of a hollow rotor of the motor, a ball screw is formed at the outer periphery of the screw, the balls are engaged with the ball screw such that the screw is set coaxial to the rotor, and wherein the screw provided with the ball screw is moved linearly by means of the rotation of the balls disposed circumferentially at the inner periphery of the rotor.

7 Claims, 10 Drawing Sheets

LINEAR ACTUATOR

BACKGROUND OF THE INVENTION

1. Field of the Invention

The present invention relates to a linear actuator, and particularly a linear actuator to convert a rotational movement into a linear movement.

2. Description of the Related Art

A linear actuator is conventionally provided which, for example, converts a rotational movement of a motor into a linear movement of an output shaft.

For example, in a linear actuator disclosed in Japanese Patent Application Laid-Open No. 2002-122203, the outer periphery of an output shaft is provided with a screw thread while the inner periphery of a nut as a mating member fixedly attached to a rotor of a motor is provided with a screw thread, wherein both of the screw threads engage with each other whereby the rotational movement of the rotor is converted into the linear movement of the output shaft in the axial direction.

Also, in a linear actuator disclosed in Japanese Patent Application Laid-Open No. 2002-372117, a ball screw system is provided between a rotor and an output shaft, whereby the rotational movement of the rotor is converted into the linear movement in the axial direction.

In the linear actuator disclosed in Japanese Patent Application Laid-Open No. 2002-122203, the rotational movement of the rotor is transmitted to the output shaft by means of a screw system which has a high friction resistance, and therefore the transmission efficiency is low thus preventing the torque of the motor from being transmitted sufficiently.

On the other hand, in the linear actuator which is disclosed in Japanese Patent Application Laid-Open No. 2002-372117, and which uses a ball screw system, the output shaft is provided with a ball screw, and also a place corresponding to a nut is provided with a ball groove, wherein balls must be circulated without running off from the screw portion, thus resulting in a complicated structure.

SUMMARY OF THE INVENTION

The present invention has been made in light of the problems described above, and it is an object of the present invention to provide a linear actuator which has a simple structure, and at the same time in which a large thrust force is raised even with a small torque.

In order to achieve the object described above, according to an aspect of the present invention, there is provided a linear actuator which includes a motor and a screw as an output shaft and in which the rotational movement of the motor is converted into the linear movement of the screw, wherein at least one retainer to hold a plurality of balls is disposed at the inner periphery of a hollow rotor of the motor, a ball screw is formed at the outer periphery of the screw, the balls are engaged with the ball screw such that the screw is set coaxial to the rotor, and wherein the screw provided with the ball screw is moved linearly by means of the rotation of the balls disposed circumferentially at the inner periphery of the rotor.

In the aspect of the present invention, the linear actuator may include a plurality of retainers disposed to be located apart from each other in the axial direction of the screw.

In the aspect of the present invention, the linear actuator may include one retainer, and the plurality of balls held by the one retainer may be arranged in a plurality of rows in the axial direction of the screw.

In the aspect of the present invention, the liner actuator may include a rotation preventing member functioning to prevent the screw from rotating, which functions also to define forward and rearward moving ends of the linear movement of the screw.

In the aspect of the present invention, the rotation preventing member may be a block which is disposed around the screw and which has an axial cross section having a polygonal shape.

In the aspect of the present invention, the rotation preventing member may be a pin which is disposed on the screw and which is oriented substantially perpendicular to the axial direction of the screw.

In the aspect of the present invention, the retainer may have a ring shape.

And, in the aspect of the present invention, the retainer may have a ribbon shape.

According to the present invention, a linear actuator can be provided which has a simple structure and in which a large thrust force is raised even with a small torque.

Specifically, the linear actuator according to the present invention is structured such that a retainer to hold balls is attached to the inner periphery of a rotor without forming a ball groove at the inner periphery of the rotor, whereby a large thrust force is raised even with a small torque.

Also, the linear actuator according to the present invention includes a force transmission mechanism which incorporates a combination of a screw and balls wherein the friction resistance can be reduced by means of the balls rolling, in comparison to a force transmission mechanism which is conventionally constituted by a screw and nut engagement thus involving a high friction resistance, whereby the torque efficiency can be improved.

Also, the linear actuator according to the present invention, while maintaining a high precision, can be assembled with a reduced number of component members and with reduced man hours.

Further, the retainer of the linear actuator according to the present invention can be formed in various configurations thus resulting in a high productivity.

Still further, the balls can be made of a wide variety of materials, such as metal, ceramic, resin and the like thus resulting in a high productivity.

And moreover, the linear actuator according to the present invention is structured such that the rotation preventing member functioning to prevent the output shaft from rotating functions also as a stopper member to define the forward and backward moving ends of the output shaft, which contributes to making the assembly easier, and therefore which results in reduced assembly man hours and in a higher productivity.

BRIEF DESCRIPTION OF THE DRAWINGS

FIGS. 4A and 4B are explanatory views of a portion of the linear actuator of FIG. 1 located in a vicinity of the retainers, wherein FIG. 4A shows a side view of the screw and the retainers, and FIG. 4B shows an axial cross section of the screw and the retainers taken along an axis center of the screw;

FIGS. 10A and 10B are explanatory views of a portion of the linear actuator of FIG. 7 located in a vicinity of the ribbon retainers, wherein FIG. 10 shows a side view of the screw and the ribbon retainers, and FIG. 10B shows an axial cross section of the screw and the ribbon retainers taken along an axis center of the screw.

DETAILED DESCRIPTION OF THE INVENTION

Exemplary embodiments of the present invention will hereinafter be described with reference to the accompanying drawings.

A first embodiment of the present invention will be described with reference to FIGS. 1 to 4B.

Figure 1:
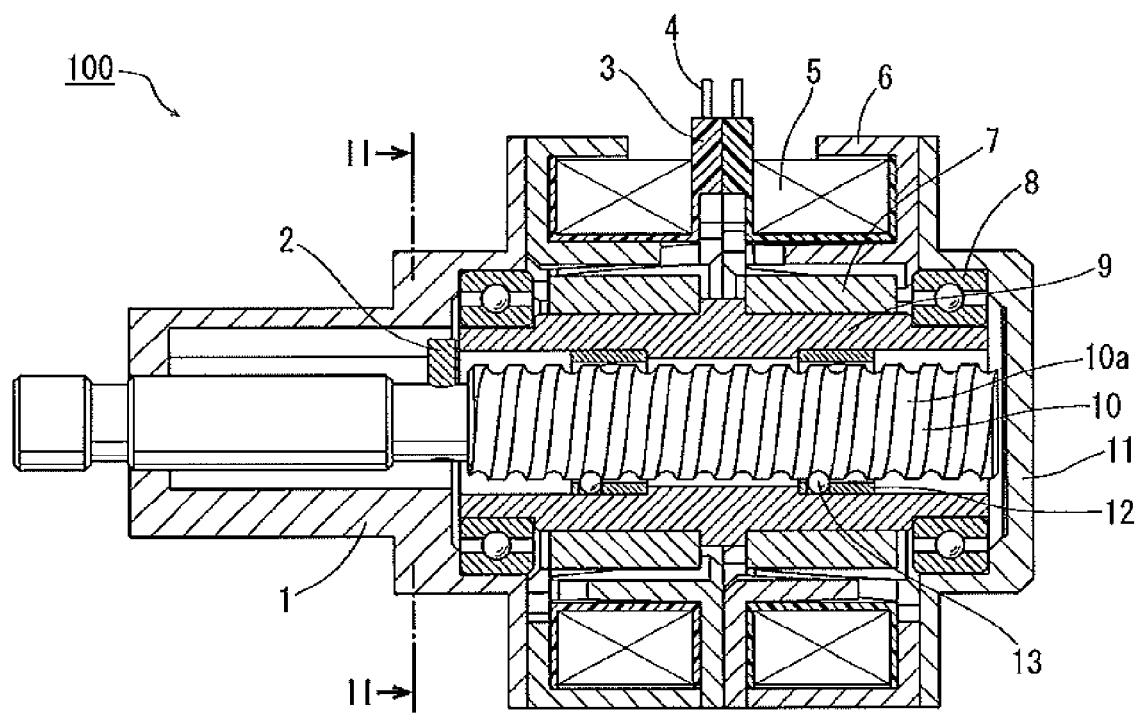
FIG. 1 is a partial axial cross-sectional view of a linear actuator according to a first embodiment of the present invention, taken at a relevant portion of an output shaft (screw)

FIG. 1 shows a partial axial cross section of a linear actuator 100 according to the first embodiment of the present invention, taken at a relevant portion of an output shaft.

Referring to FIG. 1, the linear actuator 100 according to the first embodiment includes a pair of stator units 6 which in combination form a stator assembly, has a hollow cylindrical shape and each of which includes: a coil bobbin 3; a coil 5 which is wound around the coil bobbin 3; terminal elements 4 through which electric power is supplied to the coil 5; and cylindrical stator yokes which are made of a soft magnetic steel sheet and which are formed by sheet-metal processing, and which each have pole teeth arranged at the inner periphery thereof.

The stator assembly composed of the pair of stator units 6 is fixedly sandwiched between a front housing 1 and a rear housing 11.

The linear actuator 100 further includes a rotor which is arranged in the hollow of the stator assembly and which includes: a cylindrical rotor sleeve 9 connected to the front and rear housings 1 and 11 via a pair of bearings 8, respectively, so as to be rotatable with respect to the stator units 6 of the stator assembly; and cylindrical ring magnets (field magnets) 7 fixedly attached at the outer periphery of the rotor sleeve 9 by, for example, insert fitting.

In the hollow of the rotor sleeve 9, a screw 10 as an output shaft is provided coaxially to the rotor sleeve 9. A ball screw 10a is formed at the outer periphery of the screw 10. Retainers 12, which have a cylindrical ring shape and which are adapted to hold a plurality of balls 13 having a spherical shape, are fixedly attached to the inner periphery of the rotor sleeve 9 by, for example, insert fitting.

In the second embodiment, two of the retainers 12 are provided respectively at two places of the screw 10 located apart from each other in the axial direction. The number of the retainers 12, however, is not limited to two and may be three or more. The balls 13 held by the retainers 12 engage with the ball screw 10a of the screw 10.

A pin 2 is inserted in the screw 10 so as to be oriented substantially perpendicular to the axial direction of the screw 10.

Figure 2:
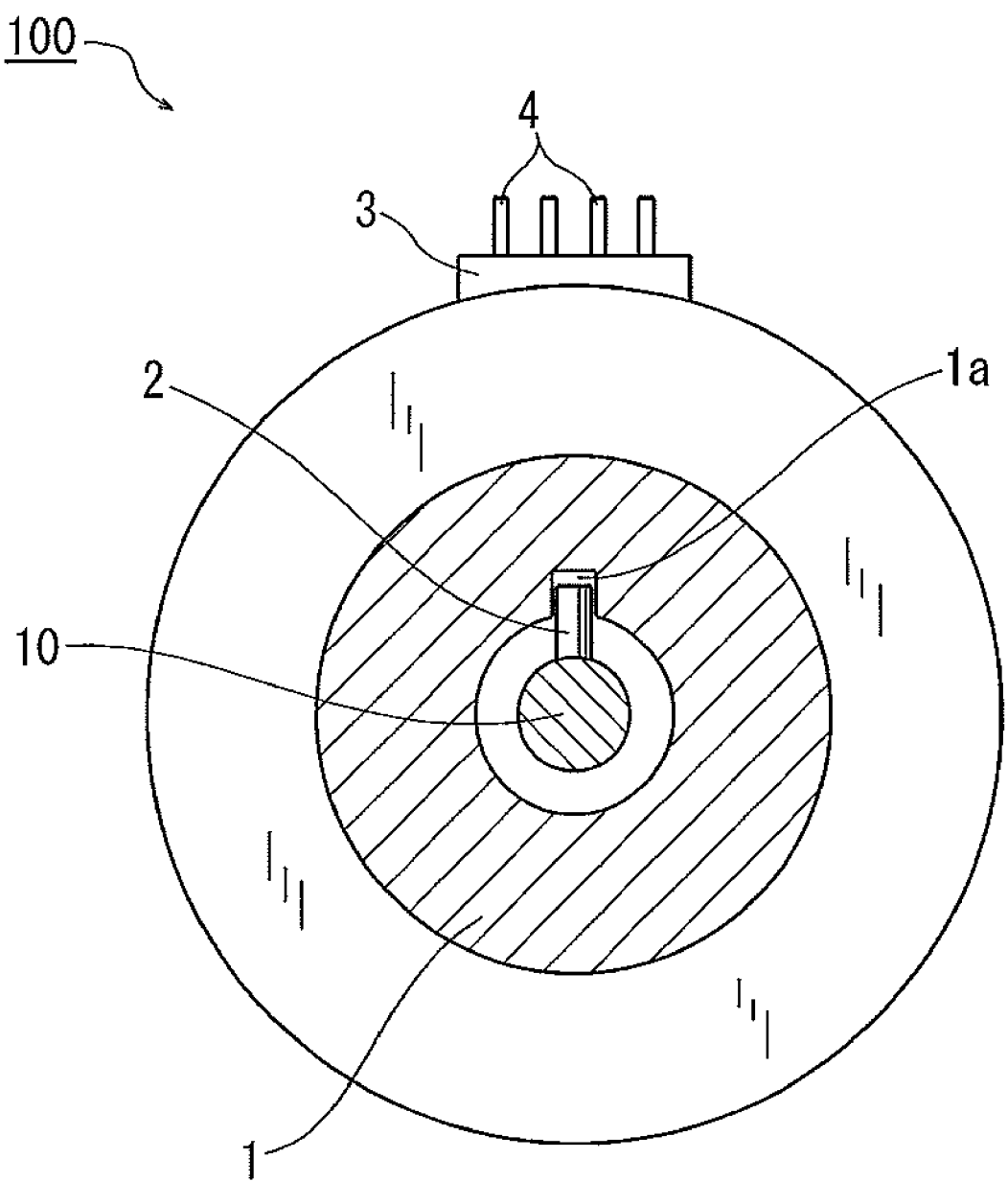
FIG. 2 is a radial cross-sectional view of the linear actuator of FIG. 1, taken along line II-II.

FIG. 2 shows a radial cross section of the linear actuator 100 of FIG. 1, taken along line II-II.

As shown in FIG. 2, the pin 2 inserted in the screw 10 radially protrudes from the outer periphery of the screw 10, and on the other hand the front housing 1 has an inner diameter larger than the outer diameter of the screw 10 and at the same time has an inner radius smaller than the dimension which is defined between the axis center of the screw 10 and the top end of the pin 2 radially protruding from the outer periphery of the screw 10.

Further, a slit 1a is arranged at a place of the inner periphery of the front housing 1 located corresponding to the pin 2. The slit 1a has a radial cross-sectional geometry substantially analogous to the longitudinal shape of the pin 2 with a slightly larger dimension and has an elongated axial dimension. With the arrangement described above, the pin 2 is prevented from coming off from the slit 1a and therefore the screw 10 is not allowed to rotate thus moving only forward and backward in the axial direction.

The slit 1a is provided with front and rear stopper members which are located at the front and rear ends of the slit 1a and which are constituted respectively by portions of the front housing 1 and the rotor sleeve 9 against which the pin 2, when moving forward and backward, hits, whereby the forward and backward moving ends of the screw 10 are defined. That is to say, the pin 2 as a rotation preventing member which prevents the screw 10 from rotating functions also as a stopper member to define the forward and backward moving ends of the linear movement of the screw 10.

In this connection, a spring, a washer or the like may be provided at the hitting places to thereby prevent the output shaft from getting stuck at the forward and backward moving ends.

Description will now be made of the retainer 12 shown in FIG. 1.

Figure 3:
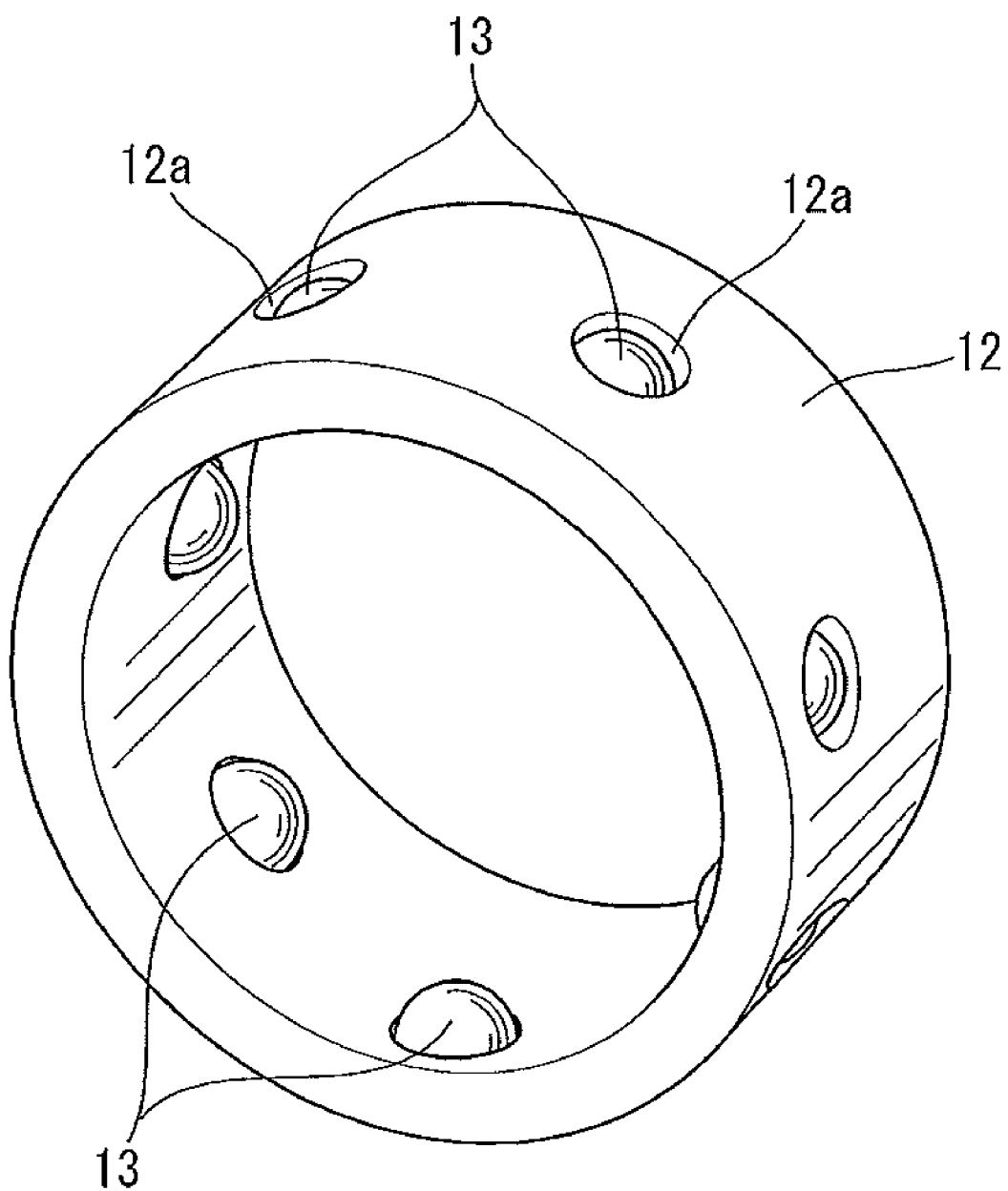
FIG. 3 is a perspective view of one of retainers of the linear actuator of FIG. 1 holding balls in place.

FIG. 3 perspectively shows the retainer 12 shown in FIG. 1 holding the balls 13 in place.

Figure 4A:
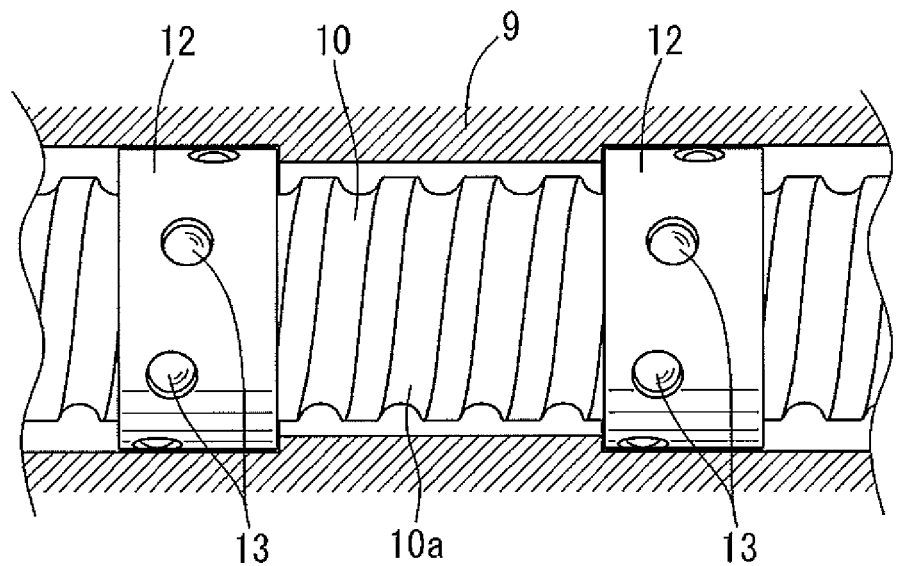
Figure 4B:
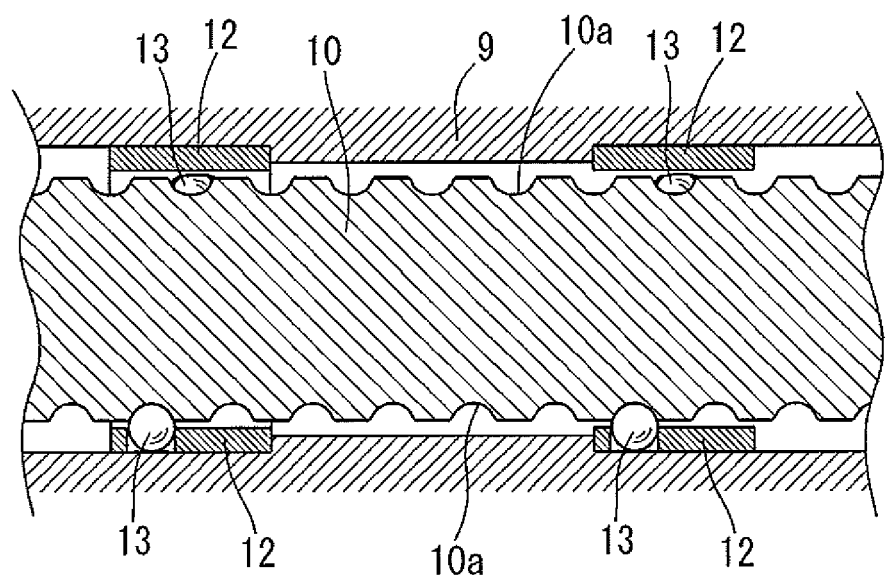

FIGS. 4A and 4B illustrate a portion of the linear actuator 100 of FIG. 1 located in the vicinity of the retainers 12, wherein FIG. 4A shows the side view of the screw 10 and the retainers 12, and FIG. 4B shows the axial cross section of the screw 10 and the retainers 12 taken along the axis center of the screw 10.

Referring to FIG. 3, a plurality of through-holes 12a are provided at each of the retainers 12 in such a manner as to be arranged equidistantly from one another in the circumferential direction and located so as to correspond to the ball screw 10a. Thus, the through-holes 12a are arranged in a spiral manner on the circumference of the retainer 12.

When the balls 13 are put in the through-holes 12a from the outer periphery of the retainer 12, the inner tip of the ball 13 protrudes inwardly from the inner periphery of the retainer 12, and a portion of the ball 13 protruding inwardly is adapted to engage with the ball screw of 10a of the screw 10.

The retainer 12 holds the balls 13 in place, wherein after the retainer 12 is attached to the rotor sleeve 9, it does not happen that the balls 13 come off. With the structure that the retainer 12 is fixedly attached to the rotor sleeve 9, the rotation of the rotor sleeve 9 is transmitted to the screw 10 via a point contact of the ball 13.

In the first embodiment, the retainer 12 is provided with seven of the through-holes 12a, which corresponds to the number of the balls 13. The present invention, however, is not limited to this arrangement, wherein it is desirable that the balls 13 support the outer periphery of the ball screw 10a of the screw 10 without backlash.

In this connection, it is not possible to unlimitedly increase the number of the balls 13 in view of the provision of the retainer 12, so it is preferable to use an odd number of the balls 13 in order to achieve a high precision and a stable load with the least number of the balls 13.

If an even number of the balls 13 are used, when a weight is applied laterally (perpendicularly to the shaft), a symmetric position appears, and it can happen that a resultant load is focused on only one of the balls 13. On the other hand, if an odd number of the balls 13 are used, the load is borne by two or more of the balls 13 and thus can be dispersed. Since it is not possible for three of the balls 13 to duly bear the load, and since the load may be focused on one of the balls 13 if four of the balls 13 are used, it is preferable to use at least five of the balls 13 or a larger odd number thereof.

According to the first embodiment, since the retainer 12 can be fixedly attached in a unified manner, by means of adhesion, insert fitting or a like method, inside the hollow rotor which includes a magnet 7 as well as the rotor sleeve 9 made of metal (stainless steel, aluminum, or the like), the only thing to be done is to set the outer periphery of the magnet 7 coaxial to the inner periphery of the rotor sleeve 9. Consequently, the linear actuator 100 can be assembly with an increased precision and with reduced man hours.

It is preferable that the retainer 12 to hold the balls 13, though not limited in terms of material, be made of metal or abrasion-resistant resin, such as polyacetal (POM) or polyphenylene sulphide (PPS), and also be structured to prevent the balls 13 from falling inside. With such a structure, the assembly can be done easily.

A second embodiment of the present invention will be described with reference to FIGS. 5 and 6.

Figure 5:
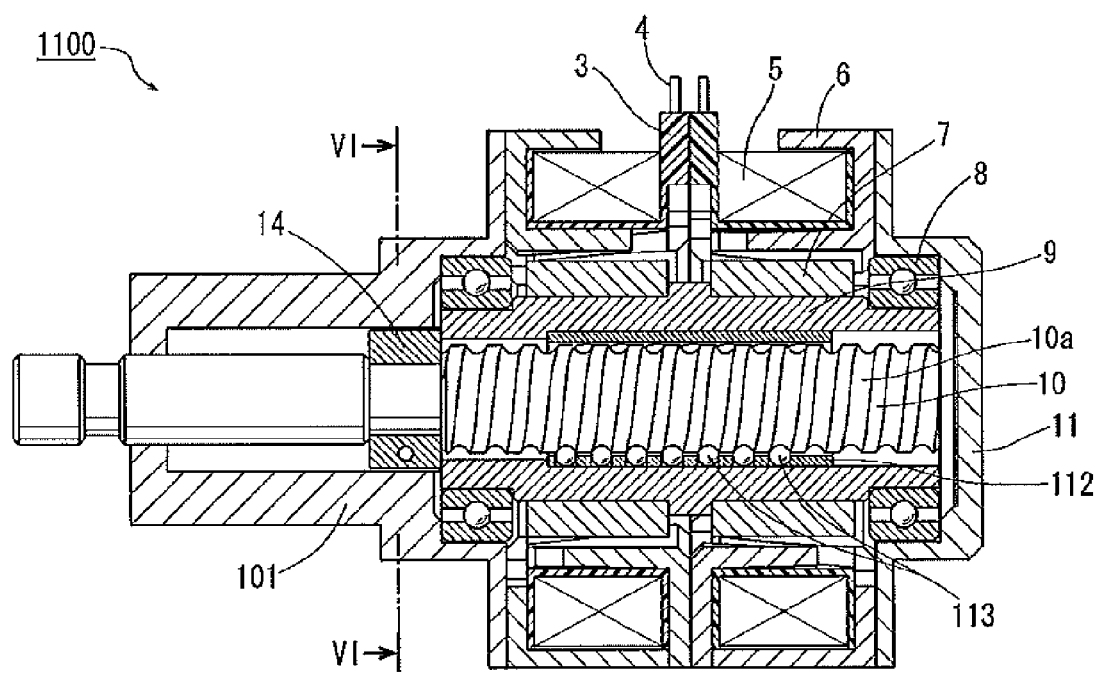
FIG. 5 is a partial axial cross-sectional view of a linear actuator according to a second embodiment of the present invention, taken at a relevant portion of an output shaft (screw)

FIG. 5 shows a partial axial cross section of a linear actuator 1100 according to the second embodiment of the present invention, taken at a relevant portion of an output shaft.

Referring to FIG. 5, the linear actuator 1100 according to the second embodiment is substantially the same as the linear actuator 100 according to the first embodiment shown in FIG. 1 except in that one retainer 112 is provided in place of the two retainers 12 and in that a block 14 is provided in place of the pin 2. So, identical parts and similar have the same reference numbers as in FIG. 1, and a detailed description thereof will be omitted.

In the hollow of a rotor sleeve 9, a screw 10 as an output shaft is arranged coaxial to the rotor sleeve 9. A ball screw 10a is formed at the outer periphery of the screw 10. The aforementioned retainer 112, which has a circular cylindrical shape and which is adapted to hold a plurality of balls 113 having a spherical shape, is fixedly attached to the inner periphery of the rotor sleeve 9 by, for example, insert fitting. The balls 113 held by the retainer 112 engage with a ball screw 10a of the screw 10.

While each retainer 12 according to the first embodiment shown in FIG. 3 is structured to hold the balls 13 in such a manner that the balls 13 are arranged in one row running around the outer periphery of the screw 10, the retainer 112 according to the second embodiment is structured to hold the balls 113 in such a manner that the balls 113 are arranged in a plurality of rows running around the outer periphery of the screw 10. In the embodiment example shown in FIG. 5, the retainer 112 holds the balls 113 provided with seven of such rows.

Also, in the second embodiment, the aforementioned block 14 is provided in place of the pin 2 as described above. The block 14 has a polygonal (quadrangular in the second embodiment) cross section taken along a direction substantially perpendicular to the axial direction, and is fixedly attached around the screw 10.

Figure 6:
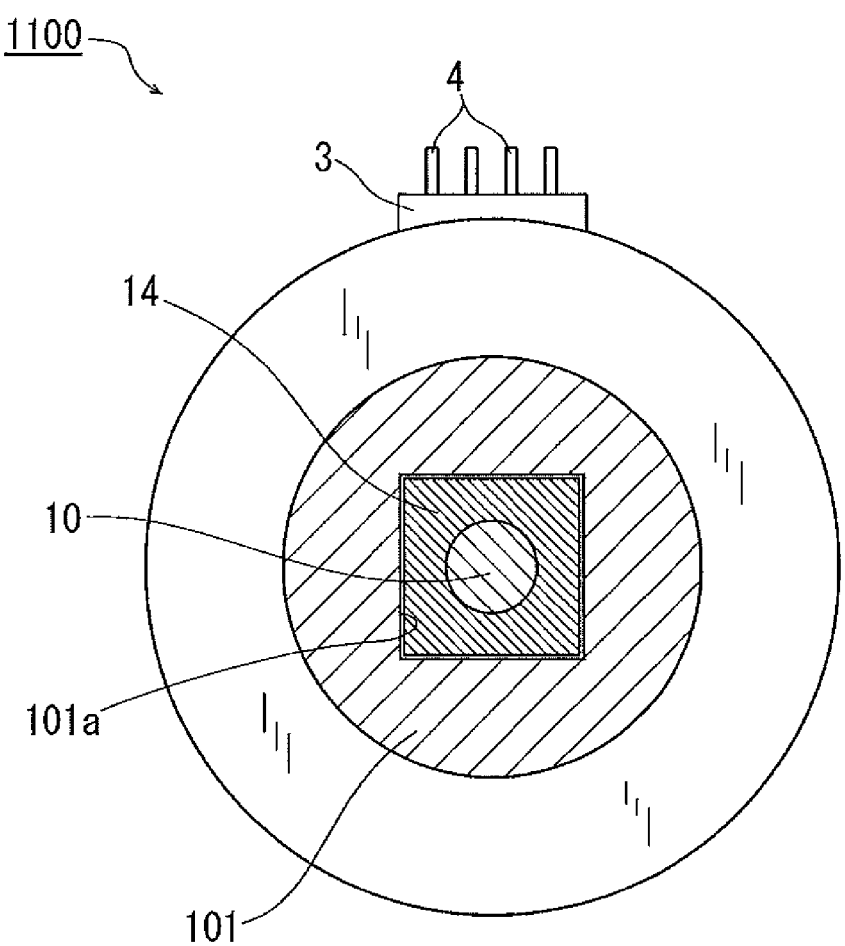
FIG. 6 is a radial cross-sectional view of the linear actuator of FIG. 5, taken along line VI-VI.

FIG. 6 shows a radial cross section of the linear actuator 1100 of FIG. 5, taken along line VI-VI.

Referring to FIG. 6, the block 14 attached around the screw 10 protrudes radially outwardly from the outer periphery of the screw 10. A front housing 101, inside which the screw 10 is housed, has a hollow 101a which has a polygonal radial cross-sectional geometry analogous to and slightly larger than the radial cross section of the block 14 and the wall surface of which is located radially outwardly of the outer periphery of the screw 10.

With the arrangement described above, the block 14, while prohibited from coming off from the polygonal hollow 101a, is prevented from moving in the circumferential direction, and therefore the screw 10 having the block 14 fixedly attached therearound is not allowed to rotate and thus allowed only to move forward and backward in the axial direction.

The polygonal hollow 101a is provided with front and rear stopper members which are located at the front and rear ends of the polygonal hollow 101a and which are constituted respectively by portions of the front housing 101 and the rotor sleeve 9 against which the block 14, when moving forward and backward, hits, whereby the forward and rearward moving ends of the screw 10 are defined. That is to say, the block 14 as a rotation preventing member which prevents the screw 10 from rotating functions also as stopper members to define the forward and rearward moving ends of the linear movement of the screw 10.

The block 14 may be composed of, for example, two pieces and put together so as to fixedly enclose and grip the small diameter portion of the screw 10, whereby the assembly can be performed easily while the screw 10 is prevented from rotating and also from axially coming off (that is to say, the forward and rearward moving ends of the linear movement are defined).

In this connection, a spring, a washer or the like may be provided at the hitting places to thereby prevent the output shaft from getting stuck at the forward and rearward moving ends.

A third embodiment of the present invention will be described with reference to FIGS. 7 to 10B.

Figure 7:
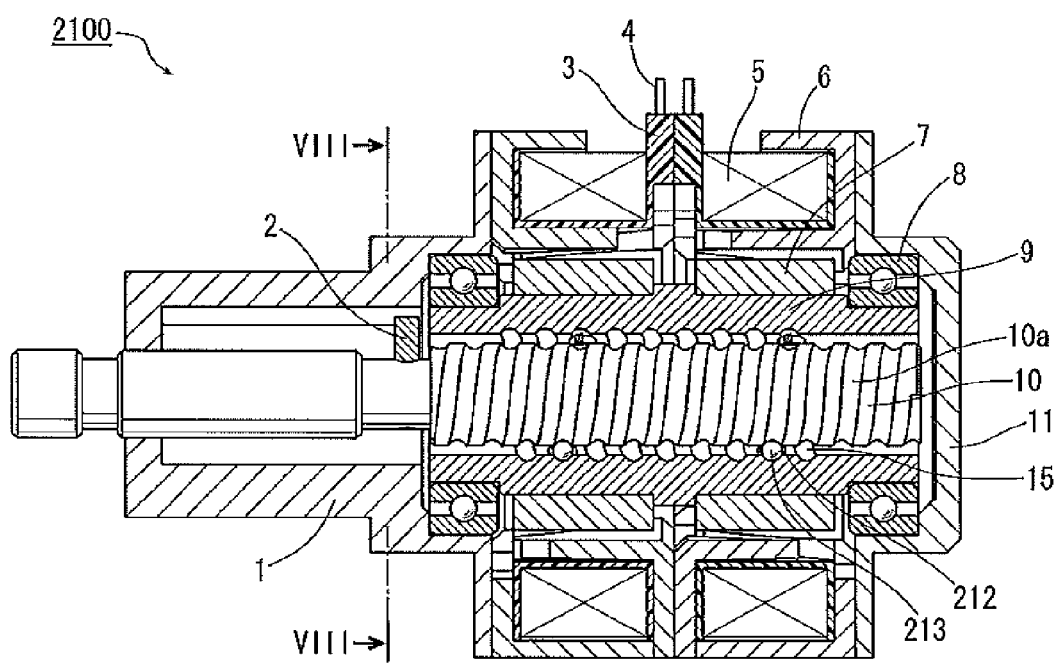
FIG. 7 is a partial axial cross-sectional view of a linear actuator according to a third embodiment of the present invention, taken at a relevant portion of an output shaft (screw)

FIG. 7 shows a partial axial cross section of a linear actuator 2100 according to the third embodiment of the present invention, taken at a relevant portion of an output shaft.

Referring to FIG. 7, the linear actuator 2100 according to the third embodiment is substantially the same as the linear actuator 100 according to the first embodiment shown in FIG. 1 except in that two ribbon retainer 212 are provided in place of the two retainers 12. So, identical and similar parts have the same reference numbers as in FIG. 1, and a detailed description thereof will be omitted.

In the hollow of a rotor sleeve 9, a screw 10 as an output shaft is provided coaxially to the rotor sleeve 9. A ball screw 10a is formed at the outer periphery of the screw 10. Ribbon retainers 212 adapted to hold a plurality of balls 213 having a spherical shape are fixedly attached to the inner periphery of the rotor sleeve 9.

In the third embodiment, two of the ribbon retainers 212 are provided respectively at two places of the screw 10 located axially apart from each other. The number of the ribbon retainers 212 is not limited to two and may be three or more. The balls 213 held by the ribbon retainers 12 engage with the ball screw 10a of the screw 10.

A pin 2 is inserted in the screw 10 so as to be oriented substantially perpendicular to the axial direction of the screw 10.

Figure 8:
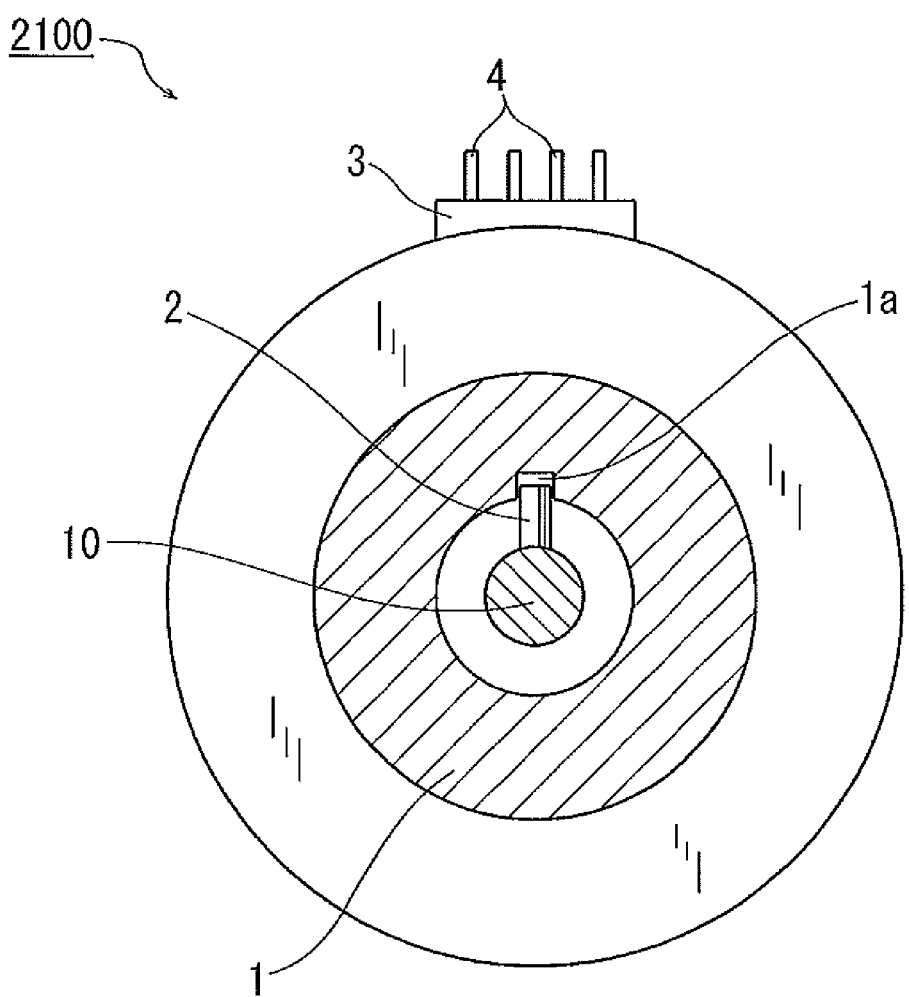
FIG. 8 is a radial cross-sectional view of the linear actuator of FIG. 7, taken along line VIII-VIII.

FIG. 8 shows a radial cross section of the linear actuator 2100 of FIG. 7, taken along line VIII-VIII.

As shown in FIG. 8, the pin 2 inserted in the screw 10 radially protrudes from the outer periphery of the screw 10. On the other hand, the inner periphery of a front housing 1 has a larger diameter than the outer periphery of the screw 10 and at the same time has a radius smaller than the dimension which is defined between the axis center of the screw 10 and the top end of the pin 2 radially protruding from the screw 10.

Further, a slit 1a is arranged at a place of the inner periphery of the front housing 1 located corresponding to the pin 2. The slit 1a has a radial geometry substantially same as the side shape of the pin 2 with a slightly larger dimension and has an elongated axial dimension.

With the arrangement described above, the pin 2 is prevented from running off from the slit 1a and therefore the screw 10 having the pin 2 inserted therein is not allowed to rotate thus moving only forward and backward in the axial direction.

The slit 1a is provided with front and rear stopper members which are located at the front and rear ends of the slit 1a and which are constituted respectively by portions of the front housing 1 and the rotor sleeve 9 against which the pin 2, when moving forward and backward, hits, whereby the forward and rearward moving ends of the screw 10 are defined. That is to say, the pin 2 as a rotation preventing member which prevents the screw 10 from rotating functions also as stopper members to define the forward and rearward moving ends of the linear movement of the screw 10.

In this connection, a spring, a washer or the like may be provided at the hitting places to thereby prevent the output shaft from getting stuck at the forward and rearward moving ends.

Description will now be made in detail of the ribbon retainer 212 shown in FIG. 7.

Figure 9:
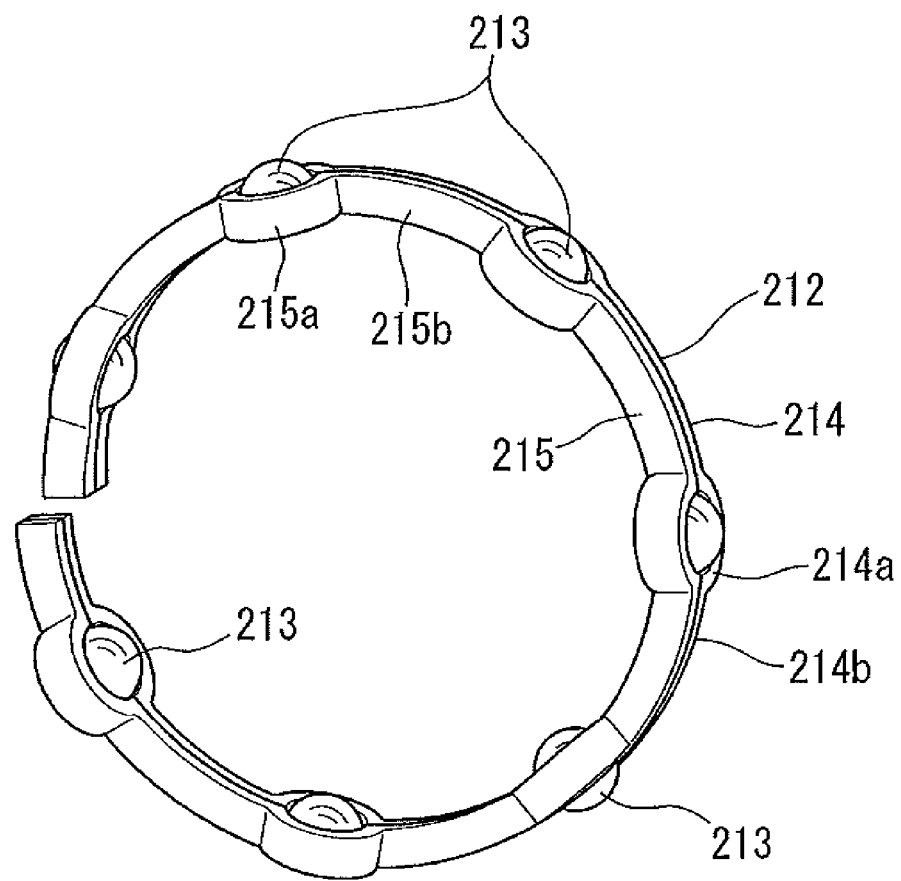
FIG. 9 is a perspective view of one of ribbon retainers of the linear actuator of FIG. 7 holding balls in place.

FIG. 9 perspectively shows the retainer 212 shown in FIG. 7 holding the balls 213 in place.

Figure 10A:
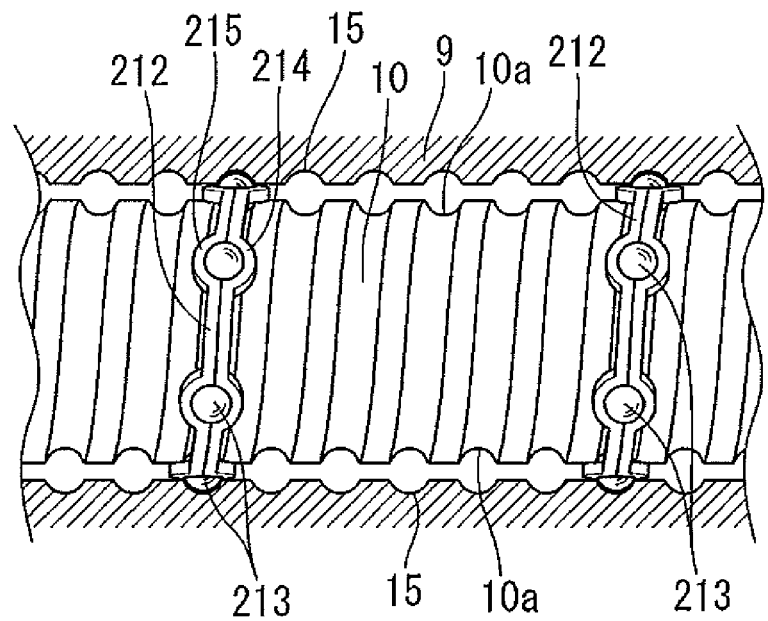
Figure 10B:
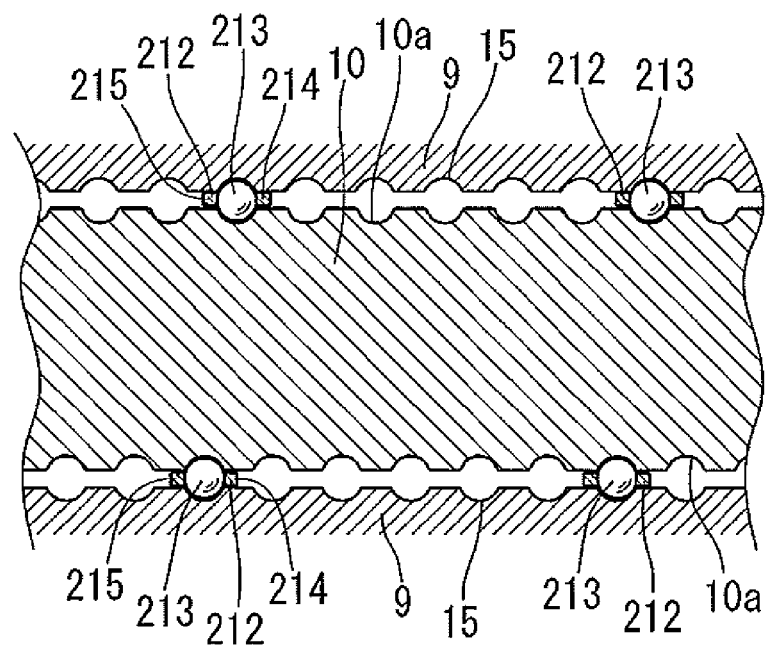

And, FIGS. 10A and 10B illustrate a portion of the linear actuator 2100 of FIG. 7 located in the vicinity of the ribbon retainers 212, wherein FIG. 10A shows the side view of the screw 10 and the ribbon retainers 212, and FIG. 10B shows the axial cross section of the screw 10 and the ribbon retainers 212 taken along the axis center of the screw 10.

Referring to FIG. 9, the ribbon retainer 212 is composed of two retainer pieces 214 and 215, which are formed by, for example, pressing a steel sheet.

The retainer piece 214 includes: a plurality of ball holding portions 214a which are arranged in an equidistant manner and which are each have a curve formed according to the shape of the ball 213 so that the balls 213 are set around the screw 10 equiangularly; and a plurality of flat portions 214b which each connect between two adjacent ball holding portions 214a.

In the same way, the retainer piece 215 includes: a plurality of ball holding portions 215a which are arranged in an equidistant manner so as to oppose the ball holding portions 214a of the retainer piece 214 and which are each have a curve formed according to the shape of the ball 213 so that the balls 213 are set around the screw 10 equiangularly; and a plurality of flat portions 215b which each connect between two adjacent ball holding portions 215a. And when the two retainer pieces 214 and 215 described above are coupled to each other, the balls 213 can be held in place around the screw 10 equidistantly.

The retainer pieces 214 and 215 are put together with the plurality (seven in the present embodiment) of balls 213 sandwiched between the respective ball holding portions 214a and 215a, and are fixed to each other by, for example, swaging.

The balls 213 held by the ribbon retainer 212 are arranged to be located corresponding to the ball screw 10a of the screw 10. That is to say, the ribbon retainer 212 is formed spirally in accordance with the spiral of the ball screw 10a of the screw 10.

In the third embodiment, as shown in FIGS. 10A and 10B, a groove 15 shaped according to the ball 213 is formed at the inner periphery of the rotor sleeve 9 and located corresponding to the balls 213 held by the ribbon retainer 212. The balls 213 are engaged with the groove 15, and the ribbon retainer 212 is fixedly attached to the rotor sleeve 9 (the ribbon retainer 212 may be fixed to the rotor sleeve 9 by adhesive or the like), and the retainer 212 is caused to rotate in accordance with the rotation of the rotor sleeve 9.

In the third embodiment, the groove 15 is formed at the inner periphery of the rotor sleeve 9, but the present invention is not limited to this arrangement, and the groove 15 may not be formed at the inner periphery of the rotor sleeve 9 wherein the ribbon retainer 212 to hold the balls 213 may be fixedly attached to the rotor sleeve 9 by adhesion, or the like.

The ribbon retainer 212 is adapted to hold the balls 213 in place, and the balls 213 are prevented from coming off from the ribbon retainer 212. While the ribbon retainer 212 stays fixedly with respect to the rotor sleeve 9, the rotation of the rotor sleeve 9 is transmitted to the screw 10 via the point contact of the ball 213.

Seven of the ball holding portions 214a and 215a of the ribbon retainer 212 as well as seven of the balls 213 are used in the third embodiment, but the present invention is not limited to this arrangement, wherein it is desirable to use five or a larger odd number of balls 213.

According to the third embodiment in which the ribbon retainers 212 are employed, the balls 213 are duly held by the ball holding portions 214a and 215a and prevented from falling inside or outside.

The present invention has been explained with respect to the specific embodiments thereof but is by no means limited thereto. It will be apparent to those skilled in the art that numerous modifications and combinations may be possible without departing from the spirit and scope of the present invention, and also various combinations of the compositions of each embodiment may be included in the present invention.

What is claimed is:

1. A linear actuator comprising:
    a stator assembly having coils obtained by winding a magnet wire arranged on a stator yoke, and pole teeth arranged on an inner periphery of the stator assembly;
    a rotor rotatably disposed in a hollow of the stator assembly with a gap opposing the pole teeth, the rotor including a ring shaped magnet arranged on an outer periphery of a hollow cylindrical sleeve;
    a ring shaped retainer disposed at an inner periphery of the sleeve, the retainer having a plurality of through-holes for housing balls;
    an output shaft having a ball screw groove on at least a portion of an outer periphery of the output shaft for engaging with the balls, the output shaft disposed in the rotor so as to be slidable in an axial direction thereof;
    a front housing disposed at a front end of the stator assembly, the housing having a groove formed at its inner circumference so as to extend parallel to the length of the output shaft; and a pin secured to the output shaft, the pin lodged in and guided by the groove so as to restrict rotation of the output shaft, wherein the through-holes are arranged in a spiral manner on a circumference of the retainer so as to correspond to the ball screw groove;

wherein the retainer comprises a first retainer and a second retainer, and the first retainer and the second retainer are disposed apart from each other in the axial direction; and wherein each of the retainers has a single row of said through-holes formed therein.

2. A linear actuator according to claim 1, wherein the magnet comprises a first magnet and a second magnet, and the first and the second magnets are disposed apart from each other in the axial direction.

3. A linear actuator according to claim 1, wherein the balls are arranged in each of the rows running around the outer periphery of the output shaft.

4. A linear actuator according to claim 3, wherein a number of the balls are used is one of at least five and a large odd numbers in each of the rows.

5. A linear actuator comprising:

a stator assembly having coils obtained by winding a magnet wire arranged on a stator yoke, and pole teeth arranged on an inner periphery of the stator assembly;

a rotor rotatably disposed in a hollow of the stator assembly with a gap opposing the pole teeth, the rotor including a magnet arranged on an outer periphery of a hollow cylindrical sleeve;

a hollow cylindrical retainer disposed at an inner periphery of the sleeve, the retainer having a plurality of through-holes for housing balls;

an output shaft having a ball screw groove on at least a portion of an outer periphery of the output shaft for engaging with the balls, the output shaft disposed in the rotor so as to be slidable in an axial direction thereof;

a front housing disposed at a front end of the stator assembly; and a rotation preventing member attached around the output shaft, wherein the through-holes are arranged in a spiral manner on a circumference of the retainer so as to correspond to the ball screw groove; and wherein the retainer comprises a first retainer and a second retainer, and the first retainer and the second retainer are disposed apart from each other in the axial direction; and wherein each of the retainers has a single row of said through-holes formed therein.

6. A linear actuator according to claim 5, wherein the ball are arranged in each of the rows running around the outer periphery of the output shaft.

7. A linear actuator according to claim 5, wherein the rotation preventing member is constituted by a polygonal shaped block attached around the output shaft, the front housing has a polygonal shaped hollow portion formed at its inner circumference, wherein the block is housed in and guided by the hollow portion so as to restrict rotation of the output shaft.

* * * * *